United States Patent [19]

Geller et al.

[11] 4,076,789

[45] Feb. 28, 1978

[54] METHOD OF FORMING AN EMBOSSED AND COATED DESIGN ON THE SURFACE OF A FORMABLE PLASTIC SHEET

[75] Inventors: Rodger E. Geller, Vandalia; Stanley E. Smith, Dayton; Wayne A. Wilson, Kettering, all of Ohio

[73] Assignee: General Motors Corporation, Detroit, Mich.

[21] Appl. No.: 675,874

[22] Filed: Apr. 12, 1976

[51] Int. Cl.² .......................... B29C 5/00; B29D 9/08; B29F 1/10
[52] U.S. Cl. .................................. 264/259; 264/296; 264/299; 264/313; 264/328
[58] Field of Search .............. 264/259, 321, 328, 329, 264/299, 293, 266, 294, 296, 245, 246, 255, 313; 425/385, 810

[56] References Cited

U.S. PATENT DOCUMENTS

| 878,513 | 2/1908 | Emerson | 425/810 |
|---|---|---|---|
| 2,722,038 | 11/1955 | Freund | 264/300 |
| 3,176,057 | 3/1965 | Peters et al. | 264/259 |
| 3,311,692 | 3/1967 | Baird | 264/293 |
| 3,368,014 | 2/1968 | Tijunelis | 264/321 |
| 3,819,315 | 6/1974 | Borchard et al. | 425/385 |

*Primary Examiner*—Willard E. Hoag
*Attorney, Agent, or Firm*—Jack I. Pulley

[57] ABSTRACT

In accordance with a preferred embodiment of this invention, a linear stitching design having improved definition, is embossed onto the surface of a hot, formable plastic sheet and then coated in one operation. The improved definition is achieved by employing a restrained elastomeric anvil to support the sheet during the embossing operation. The elastomeric anvil provides a relatively uniform distribution of pressure on the sheet during the embossing step and urges the sheet into intimate contact with the recessed features on the embossing die surface. Once the sheet is formed but before the embossing die and anvil surface are separated, paint is injected through passages in the embossing die onto the surface of the thermoplastic sheet. The paint is injected under sufficient pressure to force the thermoplastic sheet, which is supported by the elastomeric anvil, away from the die surface; this provides the necessary space to allow the paint to flow onto specified areas of the sheet.

2 Claims, 9 Drawing Figures

METHOD OF FORMING AN EMBOSSED AND COATED DESIGN ON THE SURFACE OF A FORMABLE PLASTIC SHEET

FIELD OF THE INVENTION

This invention relates to a method of coating and embossing a plastic sheet.

BACKGROUND OF THE INVENTION

In many prior art methods of embossing designs, such as stitching, onto a thermoplastic sheet, both the anvil surface and the embossing die surface were rigid and hard. In addition, the anvil surface was typically flat. The combination of the hard flat anvil surface and the hard embossing die surface provided an uneven distribution of pressure on the thin thermoplastic sheet, as it was being formed, and this often produced distortions in the thickness of the sheet. Furthermore, to form raised bosses on the surface of the sheet, it was necessary to force the material to plastically flow from the high pressure debossing areas into the low pressure embossing regions. This required high temperatures, high pressures, and in general, dictated that the process be closely controlled because there was always the danger of projecting features on the die cutting through the thermoplastic sheet.

Some improvement in the embossed pattern is achieved by using an unrestrained slab of elastomer as the embossing anvil. The elastomeric slab is intended to react to the pressure of the embossing die by undergoing a displacement such that the hot plastic sheet is more uniformly and completely forced into contact with the embossing die.

The decorative coating of embossed designs presents many problems, not the least of which is the cost of separate preparatory steps such as masking. Often these problems were solved by simply avoiding liquid painting (i.e., coating) methods and using transfer type coating techniques. The subject invention solves these problems and provides a simple economical method of forming an attractive coated and embossed design in one operation. We have found that the subject coating method is particularly effective in combination with embossing techniques that employ an elastomeric anvil. Preferably, the anvil is laterally restrained so that it is not pushed from under the embossing die.

Hereinafter the term embossing is used to denote the overall process of impressing a design onto a formable sheet, wherein said design may have both raised and lowered features.

OBJECTS OF THE INVENTION

This invention provides an improved method of forming a coated and embossed design on the surface of a hot formable plastic sheet. The hot sheet is first embossed between a rigid embossing die and a restrained elastomeric anvil surface which reacts to the die pressure by urging the sheet into the recesses of the die. A liquid coating composition is then injected through passages in the embossing die onto the surface of the embossed sheet. The restrained elastomeric anvil plays an important role in both the coating and the embossing steps.

SUMMARY OF THE INVENTION

In accordance with a preferred embodiment of this invention, a linear stitching design having improved definition is embossed onto the surface of a hot thermoplastic sheet and then coated in one operation. The preheated sheet is pressed between a rigid embossing die surface and a restrained elastomeric anvil having a durometer A hardness of from about 35 to about 60. The elastomeric anvil is inlaid in a support member which is typically a vacuum forming buck and is thereby laterally restrained from flowing out from under the embossing die as it forms the sheet. Once the design has been formed, but before the embossing die and the anvil are separated, a liquid coating composition is injected through a plurality of passages in the embossing die onto the surface of the embossed sheet.

The restrained elastomeric anvil is critical to both the embossing and coating steps; it improves the definition of the embossed design and allows the coating to flow onto predetermined areas of the embossed design. More specifically, since the deflection of any point on the elastomeric surface is directly related to the applied force, the raised features on the die surface push local regions of the sheet into the anvil during the embossing step. However, the restrained elastomeric anvil reacts to this pressure by urging the sheet upwards and into the recesses of the embossing die. By confining the elastomer member in the region underlying where the pattern is being formed on the sheet, the flexible anvil member is better able to react to the pressure of the embossing die and produce an embossment in fine sharp detail.

During the coating step, the elastomeric anvil, which at this point is supporting the sheet against the die, yields at those points where the coating is injected onto the surface of the sheet and allows the sheet to be pushed away from the die surface; this provides the space necessary for the coating to flow onto specified areas of the sheet.

Typically, the embossing die surface is characterized by raised and/or depressed features of such a shape so as to impart the desired design onto the hot pliable sheet. Incidental to the design, it is preferable that the surfaces of the design which are to be coated are clearly outlined on the embossing die surface by either raised or depressed continuous edges to provide effective masking and define the areas to be coated.

This invention provides the practitioner with improved definition of the design and, in addition, the design is embossed and painted in a single operation which provides savings when compared to multistep methods. In addition, this invention significantly reduces the need for the critical controls which are typical of prior art processes, by reducing the danger of the embossing die cutting through the hot plastic sheet.

These and other features and advantages of the subject invention will be more readily understood in view of the detailed description thereof to include a description of the attached drawings, which briefly are:

FIG. 1 is a perspective view of a portion of a thermoplastic sheet cut away in part and draped over the forming surface of a vacuum forming buck; the subject embossed stitching pattern is on the ridge surrounding the instrument cluster;

DETAILED DESCRIPTION OF THE INVENTION

Figure 2:
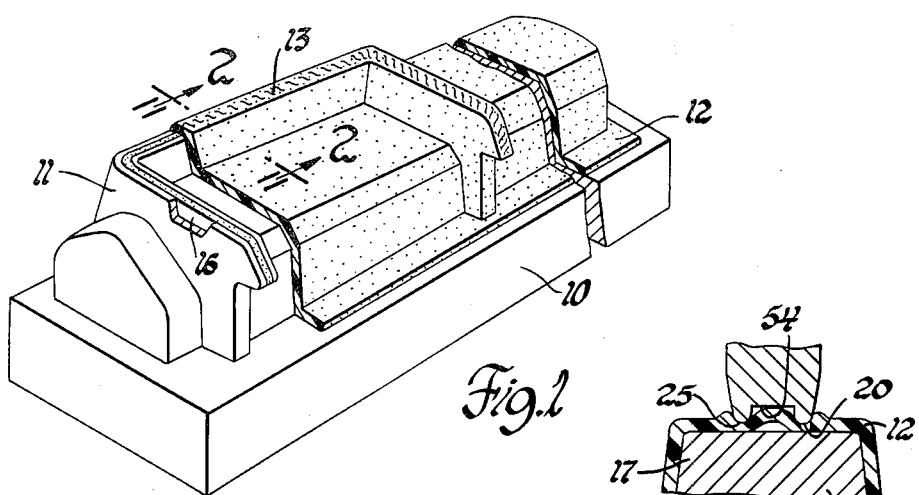
FIG. 2a is an enlarged sectional view taken at section 2—2 of FIG. 1 showing the sheet positioned over the restrained elastomeric anvil which is inlaid in the vacuum forming buck, and under the embossing die.
FIG. 2b is an enlarged sectional view taken at section 2—2 of FIG. 1 showing the plastic sheet as it is being pressed between the embossing die and the restrained elastomeric anvil.
FIG. 2c is an enlarged sectional view taken at section 2—2 of FIG. 1 showing the coating being applied to the thermoplastic sheet; the coating is applied before the embossing die is totally withdrawn.
FIG. 2d is an enlarged sectional view taken at section 2—2 of FIG. 1 showing the formed plastic sheet after the embossing die has been withdrawn.

A suitable sheet material for the practice of this invention includes any thermoformable polymeric sheet material. Preferably, the sheet is formed from any of the well-known thermoplastic materials such as poly(vinyl chloride) (PVC), acrylonitrile-butadiene-styrene (ABS) and the polyolefins. However, the thermoformable materials having a relatively low degree of cross-linking, and which therefore would not be considered thermoplastic materials, may also be used. In general, any thermoformable condensation or addition polymer would be suitable in this application.

The embossing die is suitably any of the conventional types typically used to emboss thermoplastic materials. Such dies may be made of any strong rigid material including steel, aluminum or other metals and any of several well-known rigid polymers, and glass or mineral filled versions thereof. The body which holds the elastomeric anvil in alignment with the forming features on the embossing die and which is typically a vacuum forming buck may also be formed of any of the conventional rigid die materials.

The relatively soft elastomeric anvil is preferably formed from any of the well-known elastomeric materials that have a durometer A hardness reading in the range of from about 35 to about 60. However, this material must also be able to withstand the temperatures typically used in thermoforming operations which may range up to as high as 350° to 400° F. or more. Furthermore, the elastomer preferably is able to withstand many thousands of decompression and recovery cycles at operating temperatures within a significant degree of compression set. Suitable elastomeric materials include EPDM rubber, natural rubber, cast urethane, polybutadiene, and the like. In addition, the elastomeric surface must not stick to the hot thermoformable sheet; this may be accomplished by either a careful selection of the elastomeric resin or by the use of suitable release agents such as the silicones or fluorocarbons. In certain applications, it may be advantageous to use an elastomeric surface that has been preformed to fit the contours of the forming surface.

Ideally, the inlaid elastomeric anvil is just wide enough to allow the embossing die to displace a portion of the plastic sheet into the anvil without a significant risk of striking the side walls which hold the anvil and without pinching or cutting the sheet. Nevertheless, the anvil may be somewhat wider than the ideal and yet be restrained and within the scope of the invention. It is evident, however, that as the width of the anvil increases relative to the width of the embossing die, the effect of the restraining forces exerted by the side walls will be reduced. It is believed that when the width of the inlaid anvil approaches about three or four times that of the embossing die or the embossed pattern, most beneficial effects of restraining the anvil have been lost.

It is to be noted, that a vacuum may also be applied to the sheet through the embossing die to promote a more accurate replication of the desired pattern. The same passages which supply the liquid coating may be connected to a vacuum source. The vacuum would be applied before the coating. This, however, is considered an extraordinary measure which need be used only where there are either very deep recesses in the embossing die or other factors which would alter the normal embossing conditions.

In accordance with one embodiment of the subject process, a poly(vinyl chloride) (hereinafter PVC) sheet, having a thickness of from about 20 to about 50 mils is initially heated to a temperature of about 330° F. The hot sheet, 12 in FIG. 1, is then draped over a vacuum forming buck 10 which, in this case, has the shape of an automotive instrument pad cover and a vacuum is applied to the undersurface of sheet 12, through small holes (not shown) in buck 10. This initial step forms sheet 12 to the shape of the instrument pad cover; however, small detailed designs such as the linear stitching pattern 13 cannot be adequately formed by this initial process and must be embossed.

During the vacuum forming and the embossing steps, the buck 10 is preferably cooled to a temperature of from about 110° to about 140° F. Under these conditions, the temperature of the sheet will remain above about 280° F. for about 5 seconds which should allow sufficient time for both operations. It is important that the sheet remain above 280° F. because if PVC is formed below this temperature, it retains a memory of its original shape and will begin to revert to that shape during any subsequent exposure to heat. It is to be noted, that if, in the practitioner's particular set-up, the two aforementioned operations require a period of time significantly greater or less than 5 seconds, it may be necessary to adjust the temperature of the buck to either improve production rates or to ensure that the temperature of the sheet remains above about 280° F.

Figure 2A:
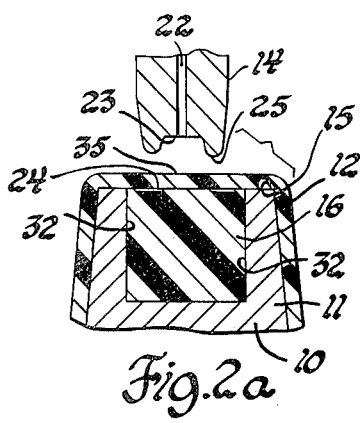

In FIG. 2a, it is seen that the portion of buck 10, underlying sheet 12, in the region where the embossed stitch is to be formed is a composite structure. Inlaid in the buck 10 is an elastomeric anvil 16, which runs along the entire ridge 11 of buck 10. The elastomeric anvil 16 is wholly supported and laterally restrained by buck 10, except for the upper surface 24 of anvil 16, which in this case is coplanar with forming surface 15 of buck 10. The anvil 16 lies immediately under the portion of sheet 12 where the stitching pattern 13 is to be formed and is somewhat wider than the stitching pattern 13, and the embossing die 14 that forms it.

Figure 2D:
Figure 2B:
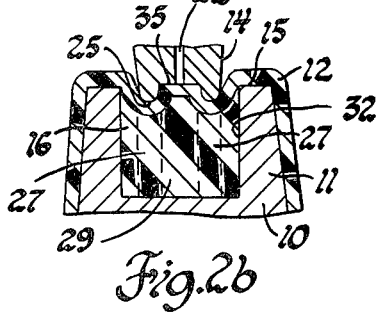

Once the sheet is in contact with ridge 11 (see FIG. 2a) which contains the elastomeric anvil 16, embossing die 14, is brought into embossing engagement with sheet 12, as shown in FIG. 2b. The embossing pressure may vary from about 5 to about 40 pounds per linear inch of the stitching pattern but is preferably near about 10. The die is held in embossing engagement for a period of from about ½ to about 5 seconds, but preferably about 2. The die is preferably operated near its ambient operating temperature and therefore requires neither external heating or cooling.

When the embossing die is at its deepest point, a short interval of air pressure is applied to a paint manifold (not shown). This pressure injects the paint, a liquid coating composition, through die passage 22 onto surface 35 of sheet 12. Sufficient pressure is used to force the sheet 12 away from the embossing die 14 and inject the paint 36 into the cavity formed thereby. A quick drying paint which is compatible with the PVC sheet material is used.

These conditions are directed to the process of embossing a linear stitching pattern on a PVC sheet and are obviously somewhat dependent on the material and the design. However, it is well within the skill of the art, given this disclosure, to adjust these operating conditions to other suitable sheet materials and designs.

As shown in FIG. 2b, the restrained elastomeric anvil 16, provides improved definition in the embossed design by effectively urging the sheet into intimate contact with the embossing die 14 and especially the recessed features 23 thereof.

The elastomeric anvil 16 is effective because of the yieldable but substantial incompressibility of elastomers, in general, and because of its restrained disposition in a support member which in this case is vacuum buck 10. These features allow the elastomeric anvil 16 to react to the forces bearing on it and to push the sheet into the deeper recesses of die 14. This reaction may be more easily understood in view of an explanation with reference to FIG. 2b.

As the embossing die 14 presses sheet 12 into the inlaid elastomeric anvil 16, those first contact regions 27 of anvil 16 which are under projections 25 of die 14 yield under the applied force. However, since elastomers are substantially incompressible, the material in first contact regions 27 must be displaced and not compressed. In the prior art methods which employ the laterally extending elastomeric anvil (see FIG. 4), the displaced material simply flowed out from under the embossing die in the direction of arrows 30 in FIG. 4. However, in the subject configuration, the lateral path is blocked by side walls 32. Therefore, the material flows into those later contact regions 29, under recessed features 23 of die 14. This causes a swelling in these areas which pushes upward and urges sheet 12 into the recesses 23 of die 14. It is believed that this mechanism is the key to the improved detail definition achieved by the restrained elastomeric anvil. However, this description of one theory of why the subject retrained elastomeric anvil provides improved definition is included only for the benefit of the practitioner and is not intended as a limitation on the scope of this invention.

Figure 3:
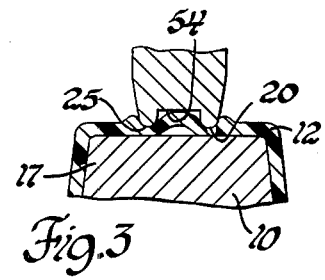
FIG. 3 is an enlarged sectional view similar to FIG. 2b showing a thermoplastic sheet as it is being pressed between an embossing die and a prior art flat rigid anvil surface.

Comparatively, the restrained anvil provides a considerable improvement over the prior art method depicted in FIG. 3 wherein the anvil 17 is flat and hard. In this method, good detail definition is difficult to obtain because the sheet material must plastically flow from the high pressure debossing region 20 to the low pressure embossing areas 54. This requires high pressures and temperatures and under these conditions the projections 25 on die 14 may easily cut sheet 12.

Figure 4:
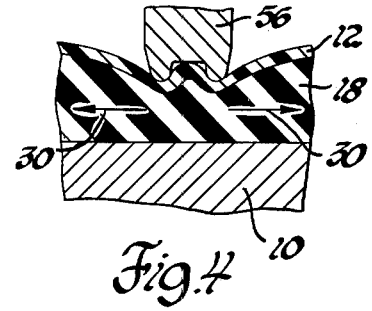
FIG. 4 is an enlarged sectional view similar to FIG. 2b showing a thermoplastic sheet as it is being pressed between an embossing die and a laterally extending unrestrained elastomeric anvil.

The restrained anvil also provides better detail definition than the method depicted in FIG. 4 which employs a laterally extending, unrestrained elastomeric anvil 18. Test results have clearly shown this improvement which is believed to be the result of the restraining forces provided by side walls 32. Without side walls 32, the elastomer tends to flow out from under die 56 in the direction of arrows 30.

Figure 2C:
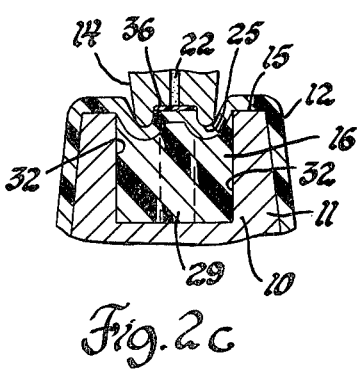

Once the stitching design has been formed, but before die 14 is totally withdrawn, the liquid coating composition 36 is injected onto the surface 35 of the embossed design through passage 22 (see FIG. 2c). In this coating step, regions 29 (FIG. 2b) of the inlaid elastomeric anvil 16 yield under the applied pressure and allow sheet 12 to be pushed away from the die 14. This allows the coating composition to flow from passage 22 onto surface 35, as shown in FIG. 2c. In die 14 which forms the subject stitching pattern, projections 25 act as dams and effectively define or mask that portion of surface 35 which is to be painted (see FIG. 2d). However, the masking may also be accomplished by using recessed portions of the die.

Figure 5:
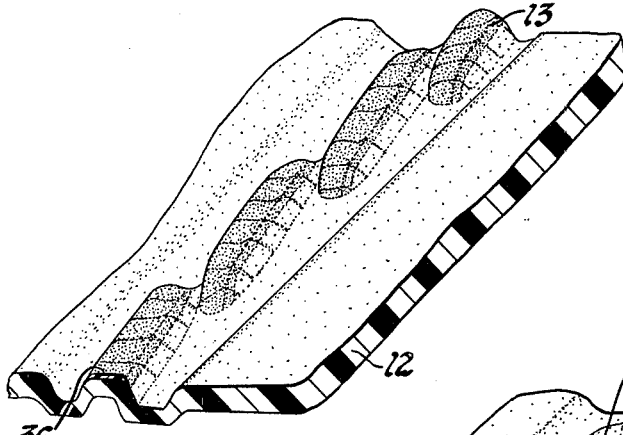
FIG. 5 is a perspective view representing the well-defined and uniformly coated stitching design formed by the subject process.
Figure 6:
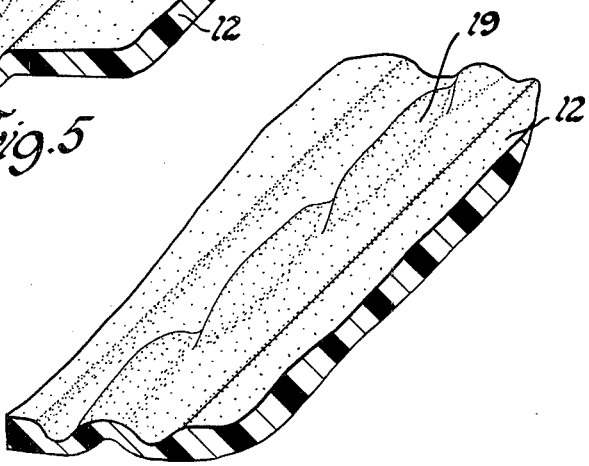
FIG. 6 is a perspective view representing a stitching design formed by a method employing a laterally extending elastomeric anvil.

A comparison is made in FIGS. 5 and 6, between the subject stitching pattern 13 (FIG. 5) and a pattern 19 embossed against a laterally extending elastomeric anvil 18 such as that depicted in FIG. 4. FIGS. 5 and 6 are representative drawings rather than an exact photographic comparison. However, carefully controlled tests have been conducted to compare the patterns produced by the subject restrained elastomeric anvil 16 and the unrestrained elastomeric anvil 18; the results clearly show that the restrained anvil produces better detail definition. The coating technique is also quite successful.

While our invention has been described in terms of certain specific embodiments, it will be appreciated that other forms thereof could readily be adapted by one skilled in the art. Therefore, the scope of our invention is not to be limited to the specific embodiments disclosed.

We claim:

1. A method of forming an embossed design on a surface of a thermoformable plastic sheet and at substantially the same time forming a coating layer on at least a portion of the embossment, comprising the steps of pressing a thermoformable plastic sheet, which has been heated to a thermoforming temperature, between an elastomeric anvil member and an embossing die, the die having a surface shaped to emboss a desired design in the surface of said sheet and to define a coating area on at least a portion of the embossment, the die having at least one passage connecting said surface with a source of liquid coating material, restraining at least the portion of said elastomeric anvil member opposing said die while the sheet is being pressed so that the anvil is not displaced laterally from under the sheet but reacts to the pressure of the die by urging the sheet into substantially full contact with the embossing surface of the die to more faithfully reproduce the desired design, forcing liquid coating composition through said passage against at least a portion of the embossed surface of the sheet, the force of the liquid pushing the sheet away from the die surface against the elastomeric anvil to deposit a layer of coating material in a desired pattern on the sheet, and thereafter separating the embossing die and the anvil and removing the embossed and coated sheet.

2. A method of forming a painted, embossed, linear stitching design on a surface of a thermoformable plastic sheet, comprising the steps of pressing a thermoformable plastic sheet, which has been heated to a thermoforming temperature, between an elastomeric anvil member and an embossing die, the die having a surface shaped to emboss a linear stitching design comprising a plurality of individual stitches in the surface of said sheet and a plurality of passages leading to the stitch defining portions of said surface for delivering paint, restraining at least the portion of said elastomeric anvil member opposing said die while the sheet is being pressed so that the anvil is not displaced laterally from under the sheet but reacts to the pressure of the die by urging the sheet into substantially full contact with the embossing surface of the die to more faithfully reproduce the stitching pattern, forcing liquid paint through said passages against the individual stitches embossed on the sheet, the force of the liquid paint pushing the sheet slightly away from the die surface against the elastomeric anvil to deposit a layer of paint on the embossed stitches, and thereafter separating the embossing die and the anvil and removing the embossed and painted sheet.

* * * * *